United States Patent
Min et al.

(10) Patent No.: US 8,599,291 B2
(45) Date of Patent: Dec. 3, 2013

(54) COLOR FILTER ARRAY, IMAGE SENSOR HAVING THE SAME, AND SIGNAL INTERPOLATING METHOD

(75) Inventors: Dong Ki Min, Seoul (KR); Young Gu Jin, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 70 days.

(21) Appl. No.: 12/893,445

(22) Filed: Sep. 29, 2010

(65) Prior Publication Data

US 2011/0085063 A1   Apr. 14, 2011

(30) Foreign Application Priority Data

Oct. 14, 2009   (KR) .................. 10-2009-0097646

(51) Int. Cl.
*H04N 5/335*   (2011.01)
(52) U.S. Cl.
USPC ......................................... 348/280; 348/273
(58) Field of Classification Search
None
See application file for complete search history.

(56) References Cited

U.S. PATENT DOCUMENTS

| | | | | |
|---|---|---|---|---|
| 4,567,510 A * | 1/1986 | Tanaka et al. | ................ | 348/273 |
| 4,939,573 A * | 7/1990 | Teranishi et al. | ............. | 348/276 |
| 5,121,192 A * | 6/1992 | Kazui | ............ | 348/277 |
| 5,323,233 A * | 6/1994 | Yamagami et al. | ........... | 348/277 |
| 6,759,646 B1 * | 7/2004 | Acharya et al. | ............... | 250/226 |
| 7,274,393 B2 * | 9/2007 | Acharya | ....................... | 348/273 |
| 7,990,447 B2 * | 8/2011 | Honda et al. | .................. | 348/294 |
| 8,045,033 B2 * | 10/2011 | Honda et al. | .................. | 348/308 |
| 2008/0218597 A1 | 9/2008 | Cho | | |
| 2010/0128152 A1 * | 5/2010 | Hayasaka et al. | ............. | 348/280 |

FOREIGN PATENT DOCUMENTS

| | | |
|---|---|---|
| JP | 2005-210218 A | 8/2005 |
| JP | 2008-219598 A | 9/2008 |
| KR | 10-2005-0051437 A | 6/2005 |
| KR | 10-2008-0106585 A | 12/2008 |
| WO | WO 2007/110829 A | 10/2007 |

* cited by examiner

*Primary Examiner* — Luong T Nguyen
(74) *Attorney, Agent, or Firm* — Lee & Morse, P.C.

(57) ABSTRACT

A color filter array of an image sensor, the color filter array including a plurality of infrared ray (IR) filters, each of which filters out light to transmit wavelengths in an IR region; a plurality of first type color filters; a plurality of second type color filters; and a plurality of third type color filters, wherein some adjacent IR filters are arranged to form a T shape.

15 Claims, 8 Drawing Sheets

FIG. 8

COLOR FILTER ARRAY, IMAGE SENSOR HAVING THE SAME, AND SIGNAL INTERPOLATING METHOD

BACKGROUND

1. Field

Embodiments relate to a color filter array, and more particularly, to a color filter array for use in an image sensor capable of detecting both color image information and depth information about an object, an image sensor including the color filter array, and an interpolation method performed in the image sensor.

2. Description of the Related Art

A color filter array for use in an image sensor includes color filters for filtering out corresponding wavelengths of visible light in order to detect color image information about an object, and infrared ray (IR) filters for filtering out corresponding wavelengths in order to detect depth information about the object.

Since a signal-to-noise ratio decreases when the size of a pixel for detecting the depth information of the object is reduced, it is difficult to obtain accurate depth information, and sensitivity may be decreased according to a luminance decrease. In the color filter array and an image sensor including the same, when filters that constitute the color filter array are not uniformly distributed, the image sensor needs a special demosaic algorithm in order to achieve signal interpolation.

SUMMARY

Embodiments are therefore directed to a color filter array, an image sensor having the same, and a signal interpolating method, which substantially overcome one or more of the problems due to the limitations and disadvantages of the related art.

It is therefore a feature of an embodiment to provide a color filter array in which red filters, green filters, and blue filters are uniformly distributed without reducing the size of a pixel for detecting depth information, an image sensor including the color filter array, and an interpolation method performed in the image.

At least one of the above and other features and advantages may also be realized by providing a color filter array for use with an image sensor, the color filter array including a plurality of infrared ray (IR) filters for filtering out wavelengths in an IR region, a plurality of first type color filters, a plurality of second type color filters and a plurality of third type color filters, wherein some adjacent IR filters are arranged to form a T shape.

A sum of the number of first type color filters and the number of second type color filters may be equal to the number of third type color filters. The first type color filters may be red filters, the second type color filters may be blue filters, and the third type color filters may be green filters. The T shape may be rotated 90 degrees, 180 degrees, or 270 degrees.

At least one of the above and other features and advantages may also be realized by providing a color filter array for use with an image sensor, the color filter array including a plurality of white filters for filtering out visible light, a plurality of first type color filters, a plurality of second type color filters, and a plurality of third type color filters, wherein some adjacent white filters are arranged to form a T shape.

At least one of the above and other features and advantages may also be realized by providing an N*N unit matrix, the method including interpolating signals output from two vertically or horizontally adjacent pixels of the image sensor, and interpolating signals output from four diagonally adjacent pixels of the image sensor.

In the interpolating of the signals output from the two vertically or horizontally adjacent pixels, a mean of the signals output from the two vertically or horizontally adjacent pixels may be calculated. In interpolating of the signals output from the four diagonally adjacent pixels, a mean of the signals output from the four diagonally adjacent pixels may be calculated. The signals output from the two vertically or horizontally adjacent pixels or from the four diagonally adjacent pixels are green signals, red signals, and blue signals.

At least one of the above and other features and advantages may also be realized by providing an image sensor including a color filter array and photoelectric conversion units for performing photoelectric conversion on signals output from the color filter array. According to an embodiment, the color filter array includes a plurality of IR filters arranged to form a T shape and different types of color filters. According to another embodiment, the color filter array includes a plurality of white filters arranged to form a T shape and different types of color filters.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0097646, filed on Oct. 14, 2009, in the Korean Intellectual Property Office, and entitled, "Color Filter Array, Image Sensor Having the Same, and Signal Interpolating Method," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 1:
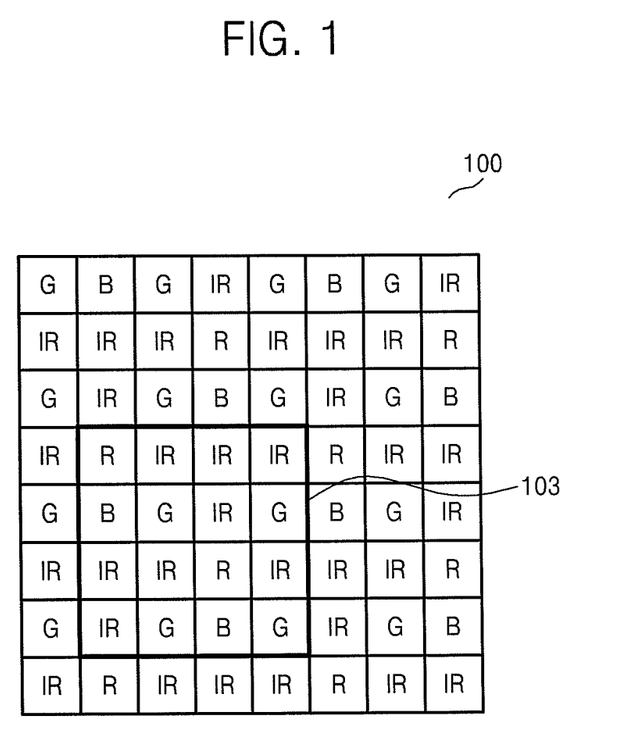
FIG. 1 illustrates a plan view of a color filter array according to an embodiment.

FIG. 1 illustrates a plan view of a color filter array 100 according to an embodiment. Referring to FIG. 1, the color filter array 100 includes a plurality of color filters R, G, and B, and a plurality of infrared ray (IR) filters IR. In some embodiments, positions of the color filters R, G, and B, and positions of the IR filters IR may be changed while maintaining a fundamental array (or pattern) of the color filter array 100 of FIG. 1. For example, the positions of the color filters G and R or the positions of the color filters G and B may be exchanged with each other. The size of a unit area obtained by all of the color filters R, G, and B may be set to equal the size of a unit area obtained by all of the IR filters IR over a unit matrix, here a 4*4 array.

The color filters include red filters R, green filters G, and blue filters B. The red filters R filter out light to transmit wavelengths in a red region of visible light, the green filters G filter out light to transmit wavelengths in a green region of visible light, and the blue filters B filter out light to transmit wavelengths in a blue region of visible light. Each of the IR filters filters out light to transmit wavelengths in an IR region.

Although the color filter array 100 may be implemented into an M*N (where M=N or M≠N) matrix, a color filter array 100 formed using a 4*4 matrix 103 as a unit matrix will now be described for convenience of explanation. As illustrated in FIG. 1, the color filter array 100 may be a color filter array using the 4*4 matrix 103 as a unit matrix.

As illustrated in FIG. 1, the 4*4 matrix 103 may include eight IR filters IR, two red filters R, four green filters G, and two blue filters B. Four of the eight IR filters IR are arranged in a T shape, and a sum of the number of first type color filters, e.g., the red filters R, and the number of second type color filters, e.g., the blue filters B, is the same as the number of third type color filters, e.g., the green filters G. The red filters R and the blue filters B may be arranged adjacent to each other. The four IR filters IR may form a T shape, which may be upright or rotated 90 degrees, 180 degrees, or 270 degrees.

In some embodiments, the red filters R may be replaced by cyan filters, yellow filters, and magenta filters, the green filters G may be replaced by the cyan filters, the yellow filters, or the magenta filters, and the blue filters B may be replaced by the cyan filters, the yellow filters, or the magenta filters.

Figure 2:
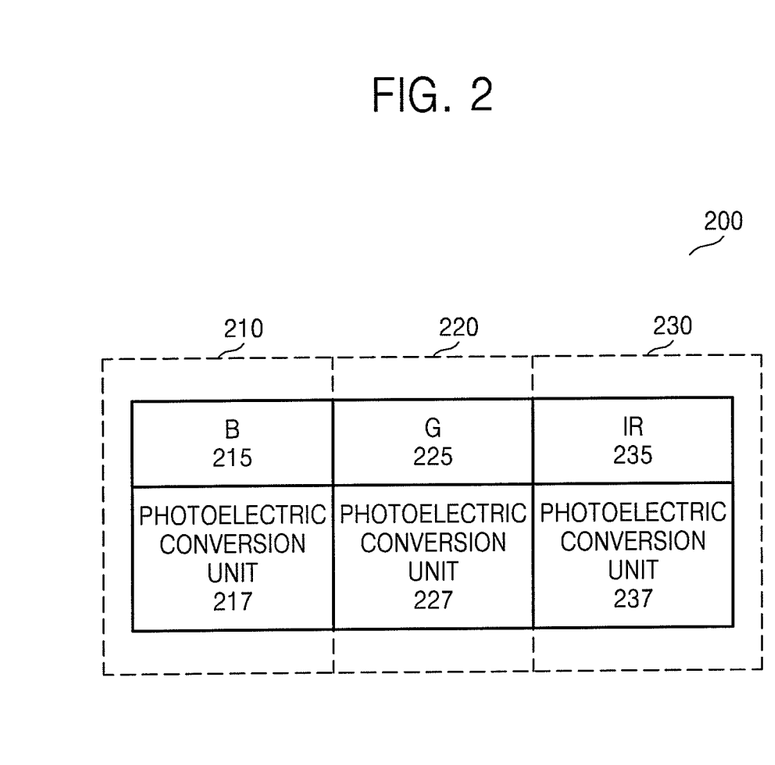
FIG. 2 illustrates a schematic cross-section of a pixel array including the color filter array illustrated in FIG. 1.

FIG. 2 illustrates a schematic cross-section of a pixel array including the color filter array 100 illustrated in FIG. 1. For convenience of explanation, a filter array 200 including a blue pixel 210, a green pixel 220, and an IR pixel 230 is illustrated. The color filter array 100 of FIG. 1 and photoelectric conversion units formed below the color filter array 100 constitute the pixel array.

The blue pixel 210 includes a blue filter 215 and a first photoelectric conversion unit 217, for example, a first photodiode. Since the blue filter 215 filters out the wavelengths in the blue region of visible light region as described above with reference to FIG. 1, the first photoelectric conversion unit 217 generates photoelectrons according to the wavelengths filtered out by the blue filter 215. Accordingly, the blue pixel 210 outputs a blue pixel signal corresponding to the wavelengths in the blue region.

The green pixel 220 includes a green filter 225 and a second photoelectric conversion unit 227, for example, a second photodiode. Since the green filter 225 filters out the wavelengths in the green region of the visible light region as described above with reference to FIG. 1, the second photoelectric conversion unit 227 generates photoelectrons according to the wavelengths filtered out by the green filter 225. Accordingly, the green pixel 220 outputs a green pixel signal corresponding to the wavelengths in the green region.

The IR pixel 230 includes an IR filter 235 and a third photoelectric conversion unit 237. The IR filter 235 filters out the wavelengths in the IR region. Accordingly, the third photoelectric conversion unit 237 generates photoelectrons corresponding to the wavelengths filtered out by the IR filter 235. Accordingly, the IR pixel 230 output a depth signal corresponding to depth information. The third photoelectric conversion unit 237 may be implemented as a photogate.

Figure 3:
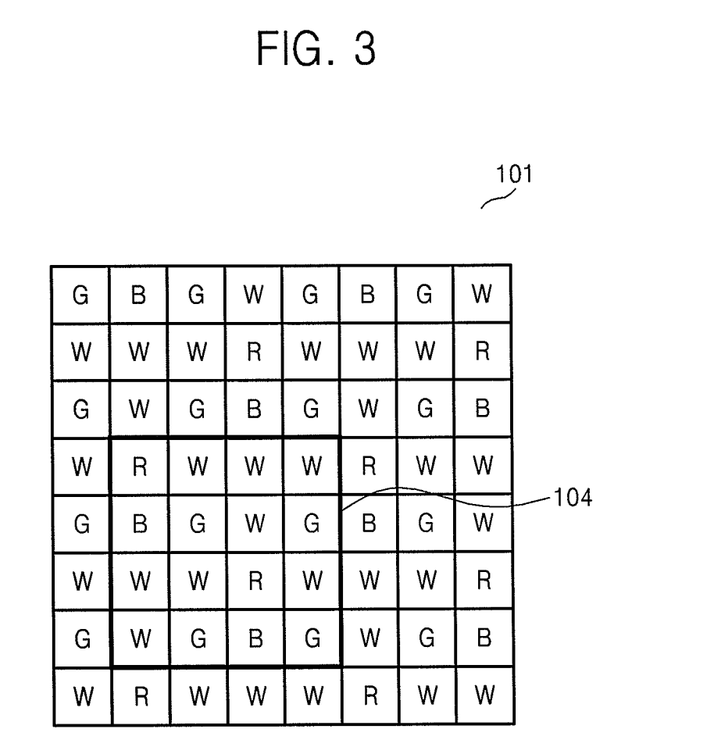
FIG. 3 illustrates a plan view of a color filter array according to another embodiment.

FIG. 3 illustrates a plan view of a color filter array 101 according to another embodiment of the present invention. Referring to FIGS. 1 and 3, the color filter array 101 of FIG. 3 is the same as the color filter array 100 of FIG. 1 except that the color filter array 101 includes a plurality of white filters W instead of the IR filters IR. As illustrated in FIG. 3, the color filter array 101 may be a color filter array using a 4*4 matrix 104 as a unit matrix.

As illustrated in FIG. 3, the 4*4 matrix 104 may include eight white filters W, two red filters R, four green filters G, and two blue filters B. Four of the eight white filters W are arranged in a T shape, and a sum of the number of first type color filters, e.g., the red filters R, and the number of second type color filters, e.g., the blue filters B, is the same as the number of third type color filters, e.g., the green filters G. The red filters R and the blue filters B may be arranged adjacent to each other. The four white filters W may form a T shape, which may be upright or may be rotated 90 degrees, 180 degrees, or 270 degrees.

In some embodiments, the red filters R may be replaced by cyan filters, yellow filters, or magenta filters, the green filters G may be replaced by the cyan filters, the yellow filters, or the magenta filters other than the filters used to replace the red filters R, and the blue filters B may be replaced by the remaining the cyan filters, the yellow filters, or the magenta filters.

Figure 4:
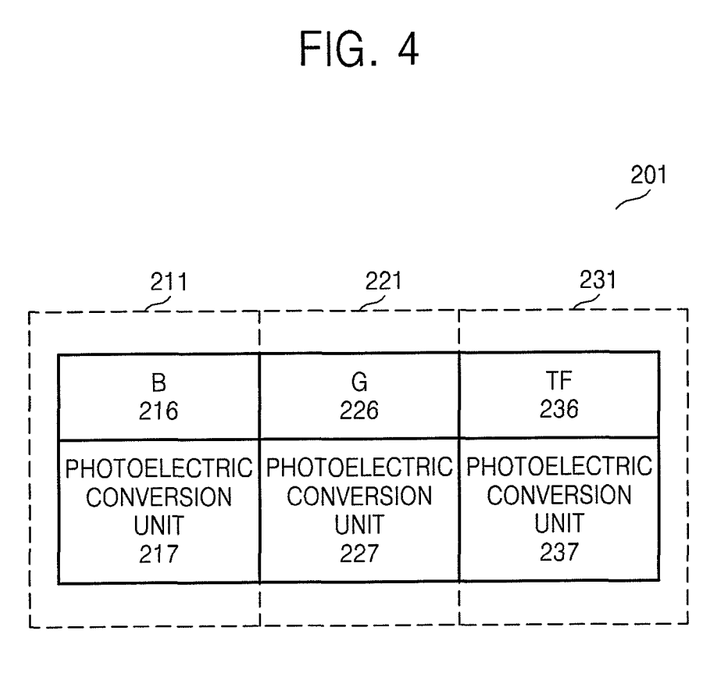
FIG. 4 illustrates a schematic cross-section of a pixel array including the color filter array illustrated in FIG. 3.

FIG. 4 is a schematic cross-section of a pixel array including the color filter array 101 illustrated in FIG. 3. For convenience of explanation, a filter array 201 including a blue pixel 211, a green pixel 221, and a white pixel 231 is illustrated.

The blue pixel 211 includes a blue filter 216 and the first photoelectric conversion unit 217, e.g., a first photodiode. The green pixel 221 includes a green filter 226 and the second photoelectric conversion unit 227, e.g., a second photodiode. The white pixel 231 includes a white filter 236 and the third photoelectric conversion unit 237, e.g., a third photodiode. The white filter 236 filters out visible light. Accordingly, the third photoelectric conversion unit 237 generates photoelectrons corresponding to the wavelengths filtered out by the white filter 236. In some embodiments, the white filter 235 may be implemented as a transparent filter TF or a filter capable of blocking IR.

As illustrated in FIG. 1 or 3, the color filter array 100 or 101 includes the IR filters IR arranged in a T shape or the white filters W arranged in a T shape.

Figure 5:
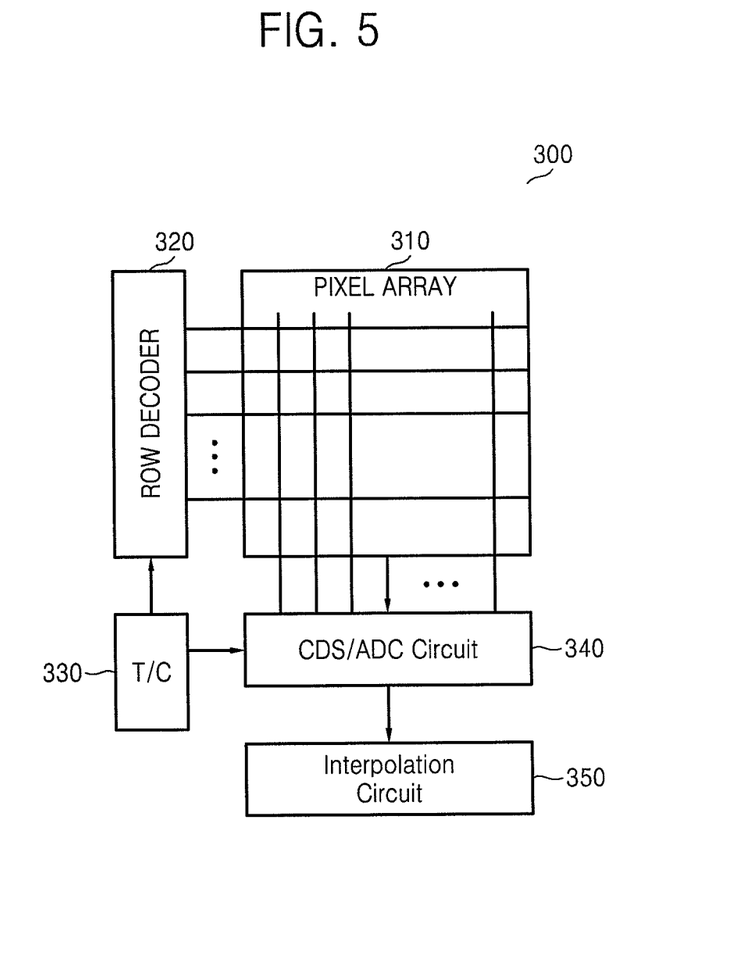
FIG. 5 illustrates a schematic block diagram of an image sensor including the pixel array including the color filter array illustrated in FIG. 1 or 3.

FIG. 5 illustrates a schematic block diagram of an image sensor 300 including a pixel array 310 including the color filter array 100 or 101 illustrated in FIG. 1 or 3. Referring to FIG. 5, the image sensor 300 that may be formed by a complementary metal-oxide semiconductor (CMOS) process includes the pixel array 310, a row decoder 320, a timing controller 330, a correlated double sampling (CDS)/analog-to-digital conversion (ADC) circuit 340, and an interpolation circuit 350. The interpolation circuit 350 may be implemented into a part of an image signal processor.

If the pixel array 310 includes the color filter array 100 of FIG. 1, the pixel array 310 includes a plurality of pixels for outputting RGB color signals (or RGB color information) and a depth signal (or depth information) according to the types of incident light. Each of the pixels outputs a color signal corresponding to incident light received via a corresponding color filter.

If the pixel array 310 includes the color filter array 101 of FIG. 3, the pixel array 310 includes a plurality of pixels for outputting RGBW color signals according to the types of incident light.

The row decoder 320 selects a row from a plurality of rows in response to an address and control signals output from the timing controller 330.

The CDS/ADC circuit 340 performs CDS with respect to each of signals output from the pixel array 310 in response to the control signals output from the timing controller 330 and performs ADC with respect to results of the CDS, thereby generating digital signals. The digital signals include an R signal, a G signal, a B signal, and a depth signal. Alternatively, the digital signals include an R signal, a G signal, a B signal, and a white signal.

The interpolation circuit 350 interpolates the digital signals output from the CDS/ADC circuit 340 according to an interpolation method which is described later with reference to FIGS. 6 and 7, and outputs signals corresponding to results of the interpolations.

Figure 6:
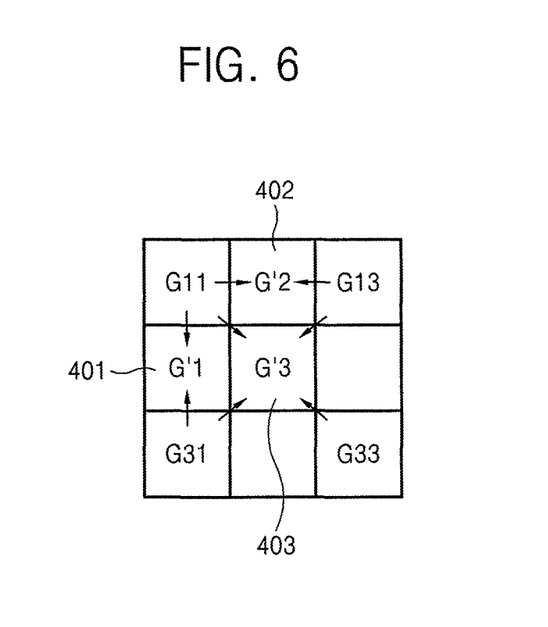
FIG. 6 illustrates a conceptual diagram for explaining an interpolation method performed in an image sensor, according to an embodiment.
Figure 7:
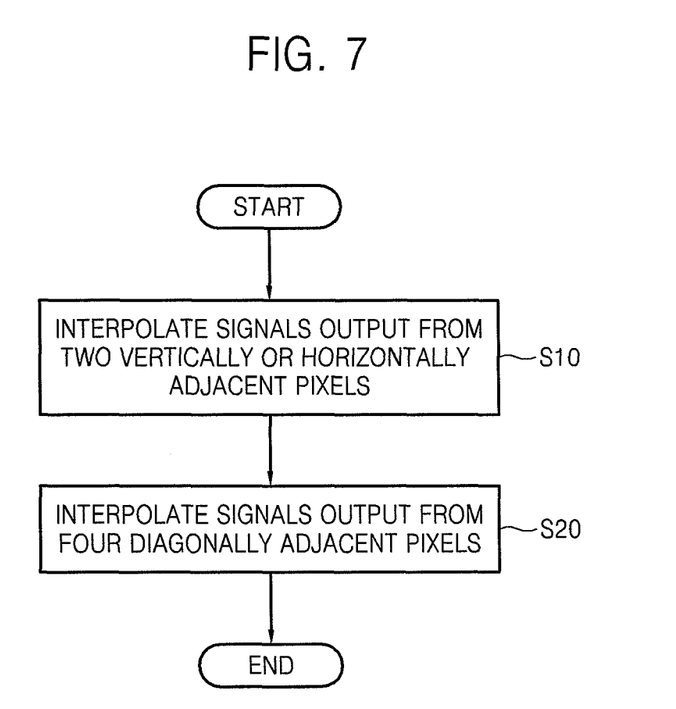
FIG. 7 illustrates a flowchart of an interpolation method performed in an image sensor, according to an embodiment.

FIG. 6 illustrates a conceptual diagram for explaining an interpolation method performed in an image sensor, according to an embodiment. FIG. 7 illustrates a flowchart of an interpolation method performed in an image sensor, according to an embodiment. Referring to FIGS. 1 through 7, an interpolation method performed in the image sensor 300 will now be described. A 3*3 matrix illustrated in FIG. 6 is a part of the 4*4 matrix 103 or 104 illustrated in FIG. 1 or 3, which is a unit matrix. For convenience of explanation, a pixel array (or a pixel pattern) illustrated in FIG. 6 considers only a green pixel.

In operation S10, the interpolation circuit 350 calculates and outputs a mean of signals output from two vertically or horizontally adjacent pixels, namely, signals output from the CDS/ADC circuit 340, according to a bilinear demosaic algorithm. In operation S20, the interpolation circuit 350 calculates and outputs a mean of signals output from four pixels diagonally adjacent to a pixel 403, namely, signals output from the CDS/ADC circuit 340.

In other words, the interpolation circuit 350 estimates a green signal G'1 of a pixel 401 from a mean of green signals output from the two vertically adjacent pixels, namely, green signals G11 and G31 output from the CDS/ADC circuit 340, as shown in Equation 1:

$$G'1 = \frac{G11 + G31}{2} \quad \text{[Equation 1]}$$

The interpolation circuit 350 estimates a green signal G'2 of a pixel 402 from a mean of green signals output from the two horizontally adjacent pixels, namely, green signals G11 and G13 output from the CDS/ADC circuit 340, as shown in Equation 2:

$$G'2 = \frac{G11 + G13}{2} \quad \text{[Equation 2]}$$

The interpolation circuit 350 estimates a green signal G'3 of the pixel 403 from a mean of green signals output from the four diagonally adjacent pixels, namely, green signals G11, G13, G31, and G33 output from the CDS/ADC circuit 340, as shown in Equation 3:

$$G'3 = \frac{G11 + G13 + G31 + G33}{4} \quad \text{[Equation 3]}$$

The interpolation circuit 350 of the image sensor 300 may estimate a green signal of a corresponding pixel from measured green signals.

The interpolation circuit 350 may estimate an R signal, a B signal, a white signal, or a depth signal using the same method as the method of estimating the green signal. As used above, the term "adjacent" is not limited to directly adjacent, but includes the next closest pixel having the same filter associated therewith.

Figure 8:
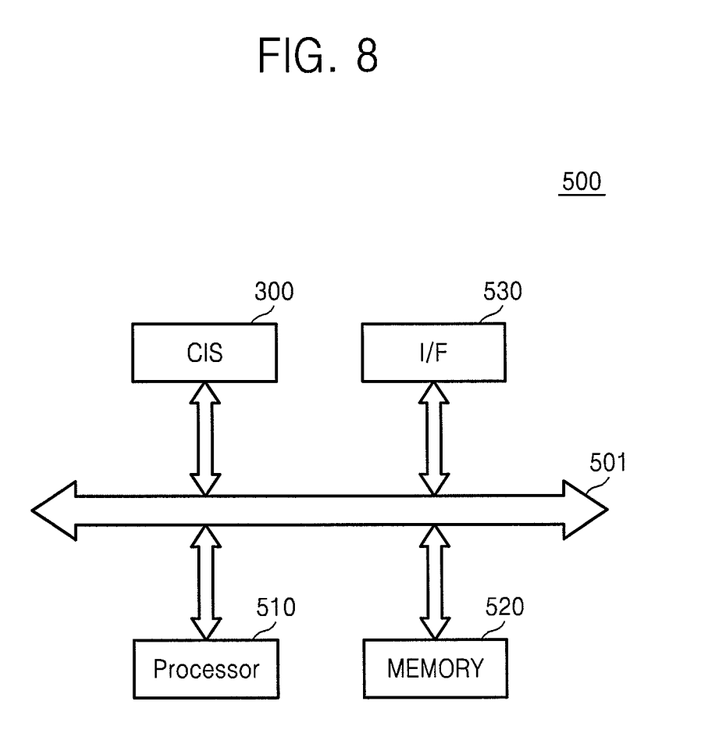
FIG. 8 illustrates a block diagram of an image capturing device including the image sensor illustrated in FIG. 5.

FIG. 8 illustrates a block diagram of an image capturing device 500 including the image sensor 300 illustrated in FIG. 5. The image capturing device 500 includes a digital camera, a mobile phone (or smart phone) with a built-in digital camera, or any electronic device including a digital camera. The image capturing device 500 may process two-dimensional or three-dimensional image information. The digital camera includes the image sensor 300 according to an embodiment of present invention.

The image capturing device 500 may include the image sensor 300 and a processor 510 for controlling an operation of the image sensor 300. The image capturing device 500 may further include an interface (I/F) 530. The I/F 530 may be an image display device. Alternatively, the I/F 530 may be an input/output device. Accordingly, the image display device may display an image captured by the image sensor 300, under the control of the processor 510.

The image capturing device 500 may further include a memory 520 that can store a still image or moving picture captured by the image sensor 300. The memory 520 may be implemented into a non-volatile memory. The non-volatile memory may include a plurality of non-volatile memory cells.

Each of the non-volatile memory cells may be implemented into Electrically Erasable Programmable Read-Only Memory (EEPROM), flash memory, magnetic RAM (MRAM), Spin-Transfer Torque MRAM, conductive bridging RAM (CBRAM), Ferroelectric RAM (FeRAM), Phase change RAM (PRAM), Resistive RAM (RRAM or ReRAM), nanotube RRAM, polymer RAM (PoRAM), nano floating gate memory (NFGM), holographic memory, Molecular Electronics Memory Device, or Insulator Resistance Change Memory.

In a color filter array according to an embodiment of the present invention, red filters, green filters, and blue filters are uniformly distributed. Sufficient depth filters, i.e., filters through which a larger wavelength region of light is passed than through the color filters so that depth information may be appropriately determined, are also included in the filter array. An image sensor including the color filter array may reproduce accurate colors.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A color filter array for use with an image sensor, the color filter array comprising:

a plurality of infrared ray (IR) filters, each of which filters out light to transmit wavelengths in an IR region;
a plurality of first type color filters;
a plurality of second type color filters; and
a plurality of third type color filters,
wherein:
some of the IR filters are arranged to form T shapes, each T shape being formed by a line of three adjacent and contiguous IR filters along a horizontal row or vertical column of the color filter array, and a fourth adjacent IR filter abutting a middle one of the three adjacent and contiguous IR filters,
at least one of the first type of color filters, second type of color filters, and third type of color filters is adjacent and contiguous to a one end of the three adjacent and contiguous IR filters of the color filter array and in line with the three adjacent and contiguous IR filters of the color filter array, and
two adjacent and contiguous different color filters of the first type of color filters, second type of color filters, and third type of color filters are abutting to the fourth adjacent IR filter, two parallel lateral boundaries of the fourth adjacent IR filter and the two adjacent and contiguous different color filters extending along two parallel lateral boundaries of the middle one of the three adjacent and contiguous IR filters.

2. The color filter array as claimed in claim 1, wherein a sum of the number of first type color filters and the number of second type color filters is equal to the number of third type color filters.

3. The color filter array as claimed in claim 1, wherein the first type color filters are red filters, the second type color filters are blue filters, and the third type color filters are green filters.

4. The color filter array as claimed in claim 1, wherein the T shape is a T shape rotated 90 degrees, 180 degrees, or 270 degrees.

5. The color filter array as claimed in claim 1, wherein the number of IR filters equals a sum of the number of the first to third color filters.

6. A color filter array for use with an image sensor, the color filter array comprising:
a plurality of white filters, each of which filters out light to transmit visible light;
a plurality of first type color filters;
a plurality of second type color filters; and
a plurality of third type color filters,
wherein:
some of the white filters are arranged to form T shapes, each T shape being formed by a line of three adjacent and contiguous white filters along a horizontal row or vertical column of the color filter array, and a fourth adjacent white filter abutting a middle one of the three adjacent and contiguous white filters,
at least one of the first type of color filters, second type of color filters, and third type of color filters is adjacent and contiguous to a one end of the three adjacent and contiguous white filters of the color filter array and in line with the three adjacent and contiguous white filters of the color filter array, and
two adjacent and contiguous different color filters of the first type of color filters, second type of color filters, and third type of color filters are abutting to the fourth adjacent white filter, two parallel lateral boundaries of the fourth adjacent white filter and the two adjacent and contiguous different color filters extending along two parallel lateral boundaries of the middle one of the three adjacent and contiguous white filters.

7. The color filter array as claimed in claim 6, wherein a sum of the number of first type color filters and the number of second type color filters is equal to the number of third type color filters.

8. The color filter array as claimed in claim 6, wherein the T shape is a T shape rotated 90 degrees, 180 degrees, or 270 degrees.

9. The color filter array as claimed in claim 6, wherein each white filter is transparent to visible light.

10. The color filter array as claimed in claim 6, wherein each white filter blocks infrared light.

11. The color filter array as claimed in claim 6, wherein the number of white filters equals a sum of the number of the first to third color filters.

12. The color filter array as claimed in claim 1, wherein the line of three adjacent and contiguous IR filters are along the horizontal row of the color filter array.

13. The color filter array as claimed in claim 12, wherein the fourth adjacent IR filter is below the middle one of the three adjacent and contiguous IR filters.

14. The color filter array as claimed in claim 6, wherein the line of three adjacent and contiguous white filters are along the horizontal row of the color filter array.

15. The color filter array as claimed in claim 14, wherein the fourth adjacent white filter is below the middle one of the three adjacent and contiguous white filters.

* * * * *